US007689650B1

(12) United States Patent
Sanghavi et al.

(10) Patent No.: US 7,689,650 B1
(45) Date of Patent: Mar. 30, 2010

(54) PRESENCE INDICATION CONFIGURATION METHODOLOGY

(75) Inventors: Mehul Sanghavi, Sunnyvale, CA (US); Brian Kobashikawa, San Francisco, CA (US); Christopher T. Szeto, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 12/209,859

(22) Filed: Sep. 12, 2008

(51) Int. Cl.
  *G06F 15/16* (2006.01)
(52) U.S. Cl. .................. 709/204; 709/205; 709/207; 709/224; 715/758
(58) Field of Classification Search .......... 709/204, 709/207, 205, 224; 715/758
  See application file for complete search history.

(56) References Cited

U.S. PATENT DOCUMENTS

| | | | |
|---|---|---|---|
| 6,148,328 A | 11/2000 | Cuomo et al. | |
| 6,484,196 B1 | 11/2002 | Maurille | |
| 6,658,095 B1 | 12/2003 | Yoakum et al. | |
| 6,697,840 B1 | 2/2004 | Godefroid et al. | |
| 6,993,327 B2 | 1/2006 | Mathis | |
| 7,069,308 B2 * | 6/2006 | Abrams | 709/218 |
| 7,139,797 B1 | 11/2006 | Yoakum et al. | |
| 7,188,153 B2 * | 3/2007 | Lunt et al. | 709/218 |
| 7,260,632 B2 | 8/2007 | Shaffer et al. | |
| 7,353,455 B2 | 4/2008 | Malik | |
| 7,370,278 B2 | 5/2008 | Malik et al. | |
| 7,395,329 B1 | 7/2008 | Holt et al. | |
| 7,412,657 B2 * | 8/2008 | Forlenza et al. | 715/751 |
| 2004/0122901 A1 * | 6/2004 | Sylvain | 709/206 |
| 2004/0186885 A1 | 9/2004 | Galli et al. | |
| 2004/0186886 A1 | 9/2004 | Galli et al. | |

(Continued)

FOREIGN PATENT DOCUMENTS

WO  WO/2004/028178 A2  4/2004

(Continued)

OTHER PUBLICATIONS

Schwartz, Barry, "Gmail Adds Live Chat & Invisible Mode Features," Feb. 26, 2008, http://searchengineland.com/080226-100643.php, downloaded on Sep. 10, 2008, 3 pages.

(Continued)

*Primary Examiner*—Yves Dalencourt
(74) *Attorney, Agent, or Firm*—Weaver Austin Villeneuve Sampson LLP

(57) ABSTRACT

A presence model is maintained for a messaging system to message among a plurality of computing device users. A permission is maintained for providing to a first computing device a presence indication for a user of a second computing device. Based on an indication of a user of the first computing device not being in a messaging list for the user of the second computing device, the permission is maintained to provide only a basic presence indication to the first computing device for the user of the second computing device. From the first computing device, a message is caused to be sent to the second computing device. Based on the maintained permission, the basic presence indication for the user of the second computing device is provided to the first computing device and a user interface element is provided via which the user of the first computing device can be added to a messaging list for the user of the second computing device.

5 Claims, 11 Drawing Sheets

U.S. PATENT DOCUMENTS

| | | |
|---|---|---|
| 2004/0186887 A1 | 9/2004 | Galli et al. |
| 2004/0205135 A1 | 10/2004 | Hallam-Baker |
| 2005/0071428 A1* | 3/2005 | Khakoo et al. ............. 709/204 |
| 2006/0004911 A1 | 1/2006 | Becker et al. |
| 2006/0190591 A1* | 8/2006 | Bobde et al. ................ 709/224 |
| 2007/0064899 A1 | 3/2007 | Boss et al. |
| 2007/0124469 A1* | 5/2007 | Mohammed et al. ........ 709/225 |
| 2008/0182563 A1 | 7/2008 | Wugofski et al. |
| 2008/0189768 A1 | 8/2008 | Callahan et al. |
| 2008/0195741 A1 | 8/2008 | Wynn et al. |
| 2008/0209528 A1 | 8/2008 | Francis et al. |
| 2008/0240384 A1* | 10/2008 | Suryanarayana et al. . 379/88.21 |

FOREIGN PATENT DOCUMENTS

| | | |
|---|---|---|
| WO | WO/2006/135022 A1 | 12/2006 |
| WO | WO/2007/016851 A1 | 2/2007 |
| WO | WO/2007/091646 A1 | 8/2007 |
| WO | WO/2008/000074 A1 | 1/2008 |
| WO | WO/2008/058365 A1 | 5/2008 |

OTHER PUBLICATIONS

Stutzman, Fred, "Facebook's New Privacy Settings," Mar. 19, 2008, http://chimprawk.blogspot.com/2008/03/facebooks-new-privacy-settings-too.html, downloaded on Sep. 10, 2008, 7 pages.

Manna, Joseph, "Managing Your AOL IM Privacy Settings," Jul. 9, 2007, http://www.peopleconnectionblog.com/2007/07/09/managing-your-aol-im-privacy-settings/, downloaded on Sep. 10, 2008, 4 pages.

Vakil, Mohammad N., "The Enhanced Presence Model," Microsoft Corporation, Sep. 2007, http://www.microsoft.com/downloads/details.aspx?FamilyId=DF0BA247-3884-43C7-A1E1-791D64B8BFA8&displaylang=en, downloaded on Jul. 21, 2008, 31 pages.

* cited by examiner

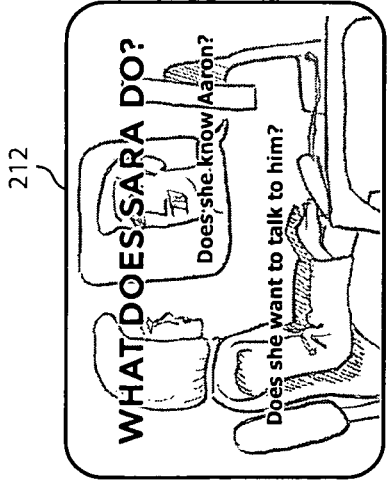
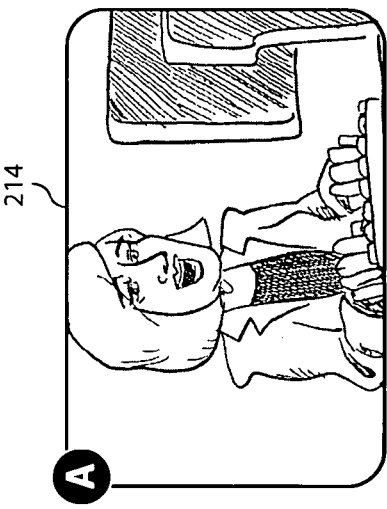
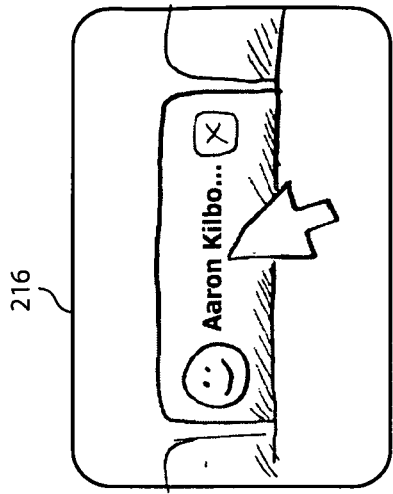

6.

7a. Sara knows Aaron! She wants to talk to him!

8a. Sara clicks on Aaron's tab, which at the moment is glowing (since it's new/unread).

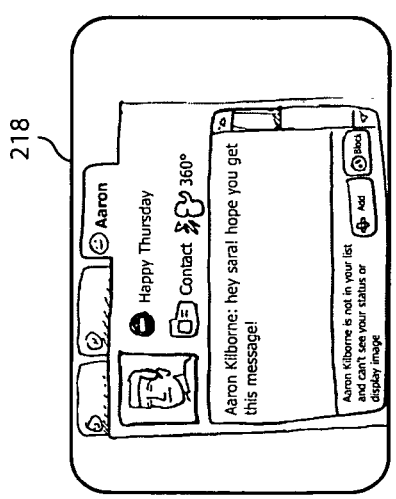
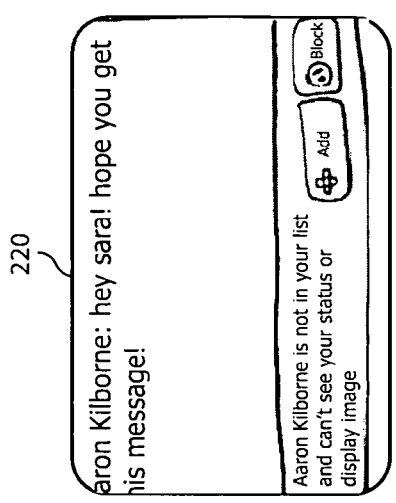
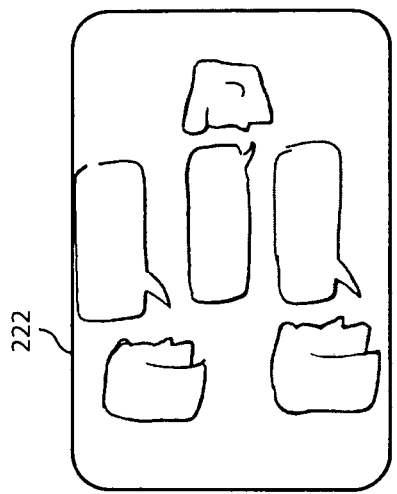

9a. Because Sara's in Aaron's List (see (4)), Sara can see Aaron's display image, status, and capabilities.

10a. At the bottom, near the input box, is a prominent notification that allows Sara to Add or Block Aaron at will. It also talks more at length about the benefits of both adding Aaron and controlling her online persona.

11a. The conversation goes on. All this time, Sara hasn't yet added Aaron - maybe she didn't notice the Add button, or she just forgot. So, Aaron still sees that Sara is online, but still does not see her status message or display image.

FIG. 2B

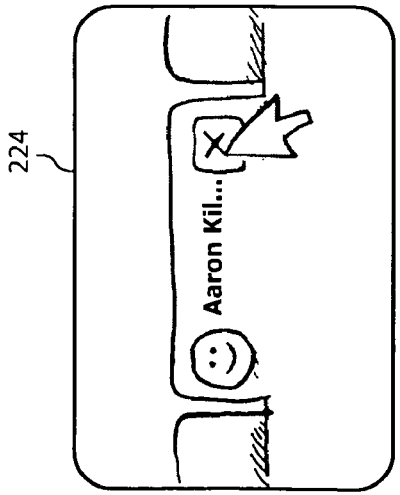

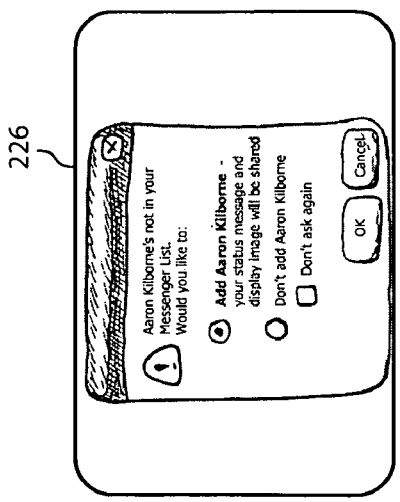

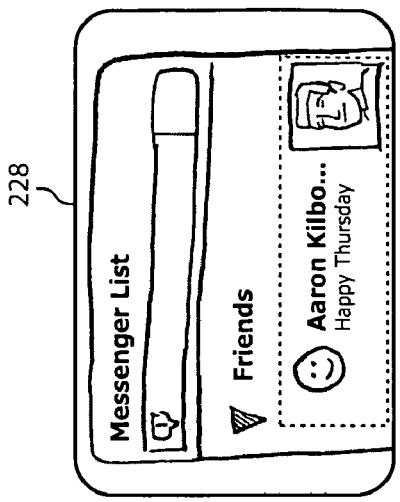

12a. Finally, Sara closes the IM window, thinking her conversation with Aaron's come to its natural close.

13a. But wait! A close dialog appears first - asking Sara if she might want to add Aaron to her Messenger List before closing the tab.

14a. Sara thinks, "Sure, why not," and Aaron - adds primarily incented by the newfound accessibility of Aaron's OP1 within her Messenger List. Likewise, she continues to see his display image and status message.

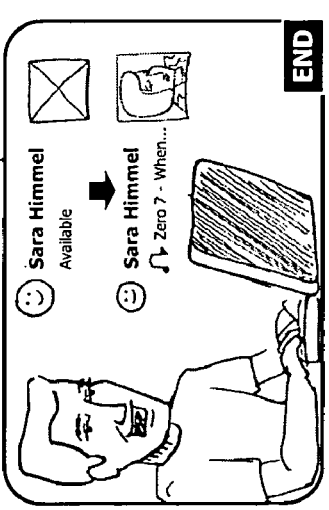

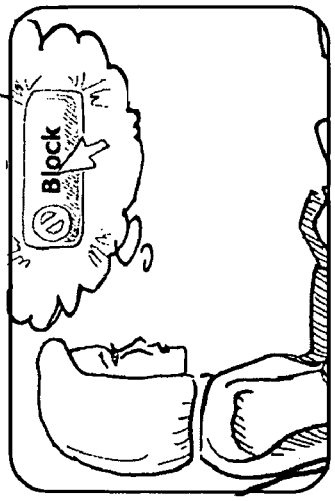

15a. At this point, Aaron finally sees Sara's display image and status message. So, a bi-directional relationship isn't created automatically, but instead depends on the recipient and how quickly she decides to reciprocate. (Ideally, this occurs within the same session, so it'll at least affect all future conversations.)

7b. Sara doesn't know Aaron. Or she doesn't want to talk to Aaron. Or she thinks he's a spammer. Or worst of all, all three!

8b. So, she's contemplating blocking Aaron permanently, especially if he keeps pinging her...

*FIG. 2C*

PRESENCE INDICATION CONFIGURATION METHODOLOGY

BACKGROUND

Presence, in a networked enterprise setting, is a published indication of a user's availability and/or willingness to communicate with other users, such as by instant messaging (IM). The indication may be "basic," including only limited information about the user ("online" or "offline"), or the indication may be "extended," including more extensive information about the user, such as status and/or profile information.

In accordance with one basic presence model, one user (User A) cannot see the presence indication for another user (User B) unless the following condition is met:

User A adds User B to User A's messenger list; and
Either
User B approves (authorizes) User A to be on User B's messenger list; or
User B approves (authorizes) User A to view User B's presence without User A being added to User B's messenger list.

Thus, once User B approves User A, each user can see the online presence indication of the other user.

It can be difficult for a user to leverage existing contact information to initiate contact with other users. This can be an impediment to building a critical mass of users with which a particular user may IM. One proposed solution has included a user sending mass invitations to other users to add the user to the other users' messenger lists, but this process can be cumbersome, redundant and chaotic.

SUMMARY

In accordance with an aspect, a method is provided to maintain a presence model for a messaging system to message among a plurality of computing device users via a communication network. A permission is maintained for providing to a first computing device a presence indication for a user of a second computing device. Based on an indication of a user of the first computing device not being in a messaging list for the user of the second computing device, the permission is maintained to provide a basic presence indication to the first computing device for the user of the second computing device and to not provide to the first computing device an enhanced presence indication for the user of the second computing device.

From the first computing device, a message is caused to be sent to the second computing device. Based on the maintained permission, the basic presence indication for the user of the second computing device is provided to the first computing device. Additionally, a user interface element is provided, to provide an indication to the messaging system of whether to add the user of the first computing device to a messaging list for the user of the second computing device, so as to maintain the permission to provide the enhanced presence indication to the first computing device for the user of the second computing device.

BRIEF DESCRIPTION OF THE FIGURES

FIGS. 2A-2D collectively show a storyboard diagram illustrating several scenarios with respect to how a presence model may be configured to selectively present basic and enhanced presence indications.

DETAILED DESCRIPTION

The inventors have realized the desirability of allowing users more control over how their presence indication may be presented to other users and, in particular, allowing for finer grained control with respect to casual and intimate contact. In a broad aspect, a basic presence indication for a particular user may be automatically provided to another user based on the other user causing a message to be sent to the particular user, the basic presence indication for the particular user being provided without explicit authorization being required by the particular user. In addition, the particular user may control, via a user interface provided to the particular user based on the message being sent from the other user to the particular user, whether the other user is allowed to be provided an enhanced presence indication for the particular user.

Thus, for example, basic presence information can be provided to users with whom the particular user may have only casual contact, without any special configuration being required, whereas enhanced presence information may be provided to users with whom the particular user has or desires to have more intimate contact. Furthermore, the level of presence information allowed to be provided need not be decided by the particular user in advance of the contact. In addition, the user may be provided the ability to control a global "default" presence indication, which may provide more less information than the basic presence information, and which may be overridden by more a detailed configuration based on user's messenger list (e.g., the messenger list may be configured to allow an enhanced presence indication to be provided to a particular other user or to completely block a presence indication from being provided to a particular other user).

Figure 1:
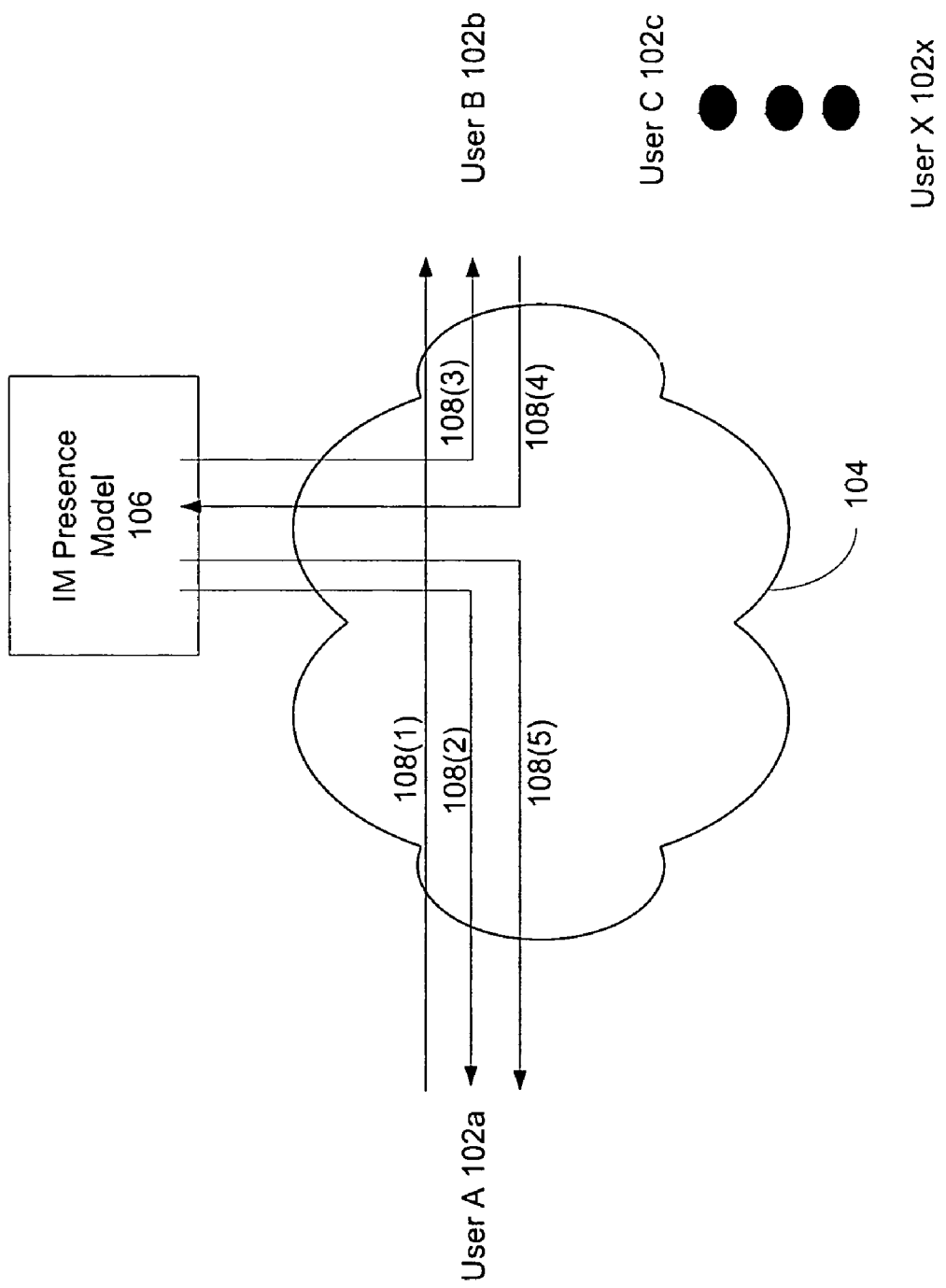
FIG. 1 is a system diagram illustrating how the provision of presence indications of users may be configured in accordance with an aspect.
Figure 2A:
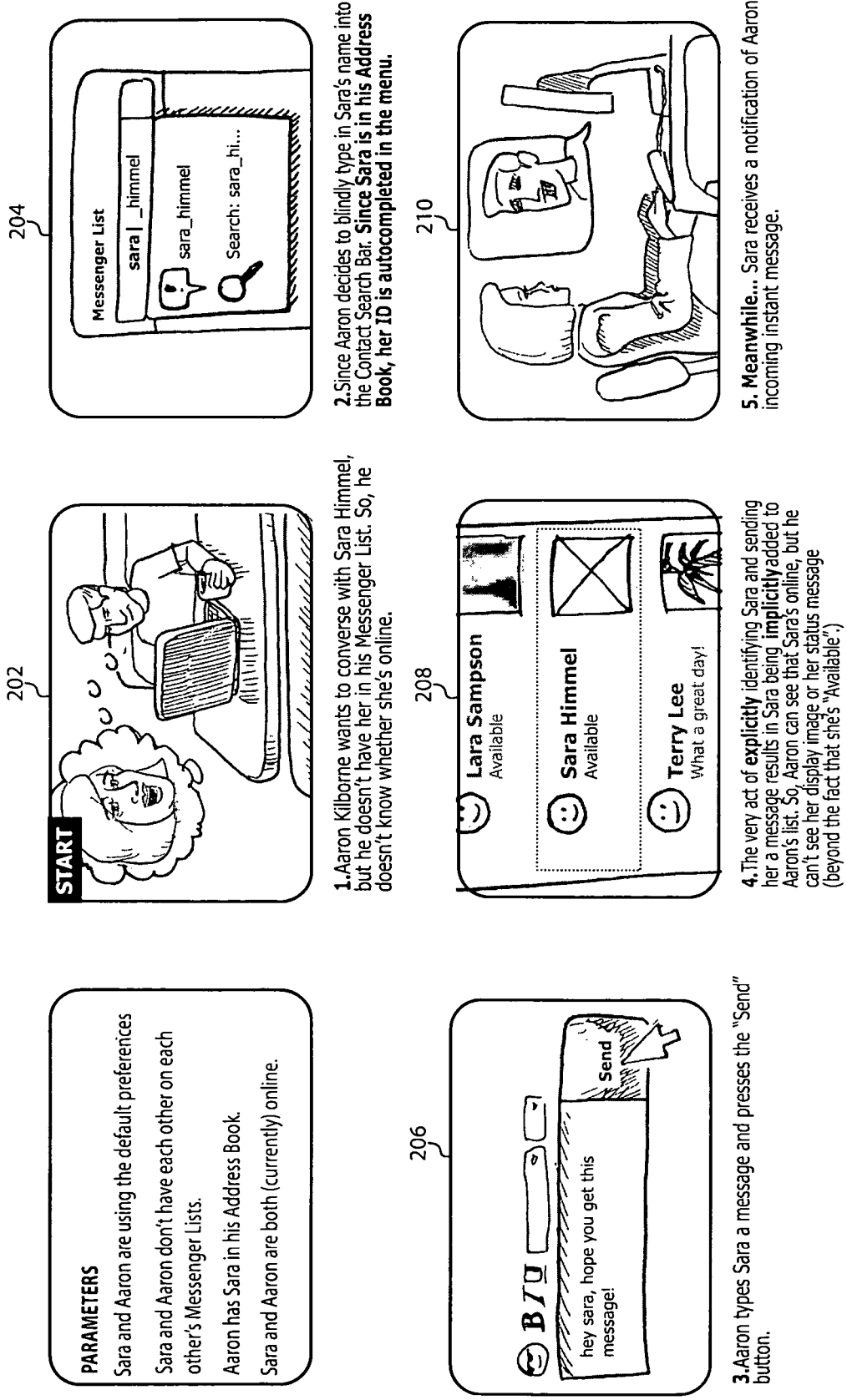
Figure 2D:
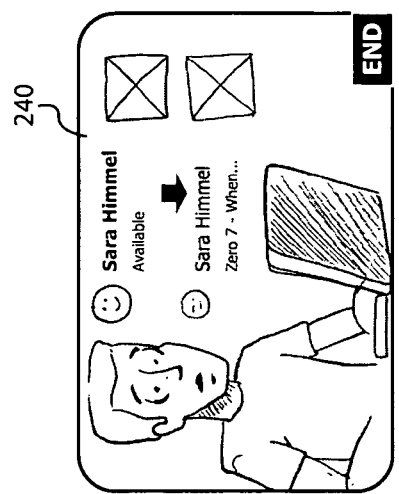
Figure 2D:
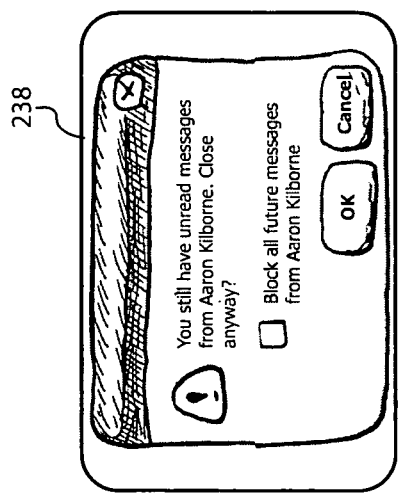
Figure 2D:
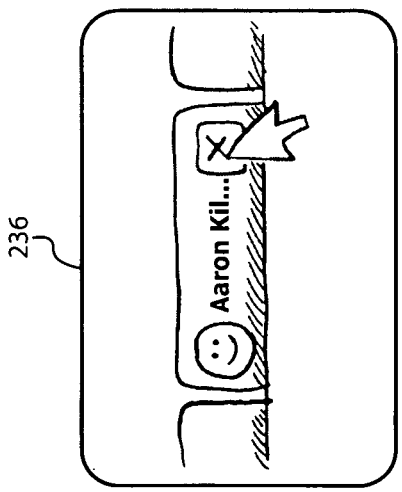

FIG. 1 schematically illustrates an aspect of the invention, in which a plurality of users (User A 102a, User B 102b, ..., User X 102x—collectively, indicated by reference numeral 102) may communicate over a network using a communication methodology such as instant messaging (IM). While some of the users may be on the same IM network, some of the users may be on different IM networks, such that inter-network communication is required to accomplish IM communication between such users. In some instances, the networks may operate according to different IM protocols, such as by accommodating for the dissimilar protocols inside the IM client application or by accommodating for the dissimilar protocols inside an IM server application.

Referring still to FIG. 1, the messaging network or networks (such as an IM network or networks) are denoted by the reference numeral 104. Typically, the IM networks 104 operate using a protocol operating over one or more public or quasi-public networks. Furthermore, an IM "presence model" 106 governs the mechanism and rules by which presence indications are shared among the users 102. The presence model is typically implemented by functionality on any one or more of client devices employed by the users 102 and/or any one or more of servers employed by one or more IM service providers.

Furthermore, FIG. 1 illustrates a scenario in which the user A 102a initiates communication to user B 102b via the messaging networks 104, as represented by arrow 108(1). This may include, for example, user A 102a interacting with a client computing device to cause an instant message to be sent to user B 102b. Furthermore, user A 102a is not in the messenger list for user B 102b, nor is user A 102a on a block list for user B 102b. As a result of the message being sent, the presence model 106 operates (108(2)) to cause a basic presence indication for User B 102b to be provided to User A 102a. Thus, user A 102a knew the IM identification for user B 102b and, thus, is able to send a message to user B 102b and get a basic presence indication for user B 102b. Furthermore, in accordance with some examples, as a result of the instant message being sent to User B 102b, a presence indication (basic or enhanced) for User A 102a may be provided to User B 102b.

In addition, a user interface element is caused (108(3)) to be provided to User B 102b, regarding whether the presence model 106 should allow an enhanced presence indication for User B 102b to be provided to User A 102a. In addition, the user interface element may also be regarding whether the presence model should allow even the basic presence indication for User B 102b to be provided to User A 102a.

Thus, User B 102b may, via the user interface element, approve (108(4)) the provision of the enhanced presence indication for User B 102b to User A 102a or block the provision of any presence indication for User B 102b to User A 102a. In this case, user B 102b approves adding user A 102a to the messenger list for user B 102b, and the enhanced presence indication for User B 102b is allowed to be provided (108(5)) to User A.

In some examples, User B 102b may neither approve the provision of the enhanced presence indication nor block the provision of any presence indication. In such an example, a default action may be taken, such as continuing to allow the basic presence indication for User B 102b to be provided to User A 102a. Furthermore, if a presence indication for User A 102a was provided to User B 102b, this may aid User B 102b in determining what action to take with respect to allowing a presence indication for User B 102b to be provided to User A 102a by, for example, providing additional information helpful for user B 102b to make a determination.

It can thus be seen that, in accordance with one broad aspect, a user may precisely control access to her presence information, based on an informed decision prompted by an attempt by another user to send a message to that user. In addition, the attempt by the other user to send the message to that user may result in allowing enhanced presence information for the other user to be provided to that user, so as to further inform that user's decision.

FIGS. 2A-2D collectively show a storyboard flowchart illustrating, in greater detail, a scenario providing an example of this presence model access methodology. The story involves two users Sara and Aaron. At frame 202, Aaron desires to converse with Sara, but Aaron doesn't know whether Sara is online since, at this point, Aaron has not been provided access to Sara's presence information. At frame 204, Aaron decides to type Sara's name into the contacts search bar. In the example, Sara is in Aaron's address book, so Sara's messaging ID is autocompleted. At frame 206, Aaron inputs a message to Sara and presses the "send" button.

In the example shown in the FIGS. 2A-2D storyboard, at frame 208, because Aaron identified Sara and sent Sara a message, in the presence model, Sara is implicitly added to the list of users for whom Aaron can be provided a presence indication—in this case, a basic presence indication. At frame 210, Sara receives a notification of the incoming instant message from Aaron. Frame 212 is an indication of Sara's quandary, whether or not to communicate with Aaron.

Frames 214 to 230 illustrate an example in which Sara decides to communicate with Aaron. At frame 214, Sara decides to communicate with Aaron. At 216, Sara clicks on the IM tab for Aaron's message, which indicates that the message from Aaron is new and unread. At 218, Sara views Aaron's presence indication (which, in the FIGS. 2A-2D storyboard example, is an enhanced presence indication such that more than the basic "online"/"offline" indication is provided).

At 220, a user interface element is provided via which Sara may add Aaron to a messenger list associated with Sara, such that Aaron is provided an enhanced presence indication for Sara. In addition, Sara may also utilize the user interface element to block Aaron from receiving even a basic presence indication for Sara, by adding Aaron to Sara's block list. However, at 222, Sara converses with Aaron, all the while without having utilized the user interface element discussed with respect to 220. In this example, Aaron continues to be provided the basic presence indication for Sara, as a default. At 224, Sara closes the IM window. At 226, a dialog box user interface element is displayed to Sara, inquiring as to whether Aaron should be added to Sara's messenger list. At 228, Sara adds Aaron to Sara's messenger list, and Sara is provided Aaron's enhanced presence indication. At 230, due to Sara's action to add Aaron to her messenger list, Aaron continues to be provided Sara's enhanced presence indication. It can thus be seen that the bi-directional relationship (in which both Aaron and Sara get access to each other's enhanced presence indication) is not established automatically but, rather, depends on Sara and how quickly Sara decides to reciprocate Aaron's request (in this example, as Aaron's request is evidenced by Aaron sending the message to Sara)

Frames 232 to 240 illustrate a scenario in which Sara decides to not allow Aaron to be presented Sara's presence indication at all. At frame 232, Sara determines that she doesn't know Aaron. At frame 234, Sara is contemplating blocking Aaron permanently from being provided Sara's presence indication. However, at frame 236, Sara decides to just close the tab indicating Aaron's message to Sara. At 238, Sara is presented with a dialog box user interface item via which Sara may put Aaron on Sara's block list, to block Aaron from being provided Sara's presence indication and, furthermore, to block future messages from Aaron. At 240, from Aaron's point of view, Sara has gone offline, since Aaron is blocked from being provided Sara's presence indication. (It should be noted that, even if Aaron is on Sara's block list, Aaron may still have access to Sara's online presence indication which, as discussed with reference to an example below, may provide Sara's online presence as a default if Aaron requests the online presence but is not identified to the IM presence model as Aaron i.e., for example, is not "logged in.")

Figure 3:
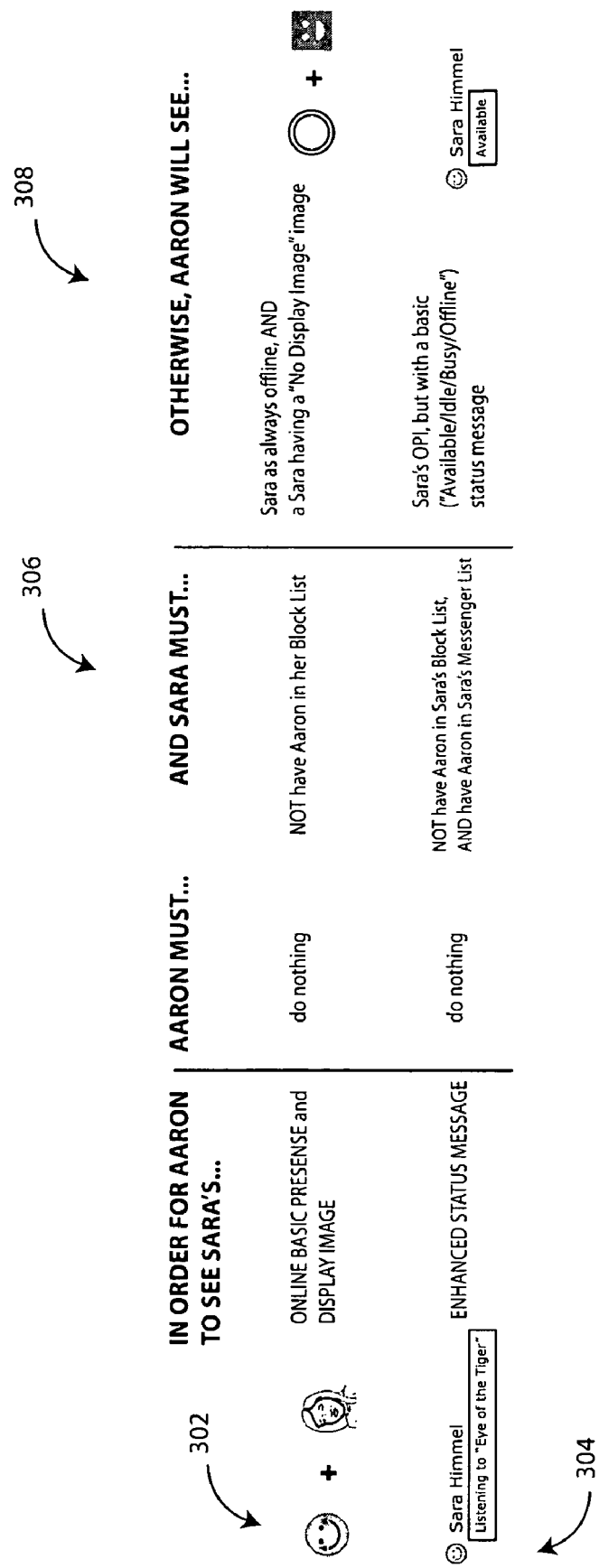
FIG. 3 is a table illustrating an example of states with respect to whether a particular user is provided with the presence indication, basic or extended, of another user.

It can thus be seen that a user can control, via her messenger list and block list, what other users will be provided her basic and/or enhanced presence indication, while there is a default state that users not in the messenger list or block list will be provided the basic presence indication as a result of identifying the user (e.g., by sending the user a message). FIG. 3 is a table illustrating an example corresponding to the FIGS. 2A-2D storyboard example, of states with respect to whether a particular user (in the example, Aaron) is provided with the presence indication, basic or extended, of another user (in the example, Sara). Row 302 represents the state of Aaron being provided with a basic presence indication for Sara, and row 304 represents the state of Aaron being provided with an extended presence indication for Sara. Furthermore, column 306 represents the conditions under which the states represented by the rows exist, and column 308 represents what state otherwise exits, in the absence of the column 306 conditions.

Turning now to FIG. 3 and specifically to column 306, it can be seen that, in accordance with the example, in order for Aaron to be provided Sara's basic presence indication, there is nothing that Aaron must do beyond specifically identifying Sara, such as by sending a message to Sara. On the other hand, Aaron must not be in Sara's block list. Thus, from column 308, in accordance with the example, it can be seen what occurs if the conditions in column 306 are not met. For example, if Aaron is in Sara's block list, then the presence indication provided to Aaron for Sara will always indicate that Sara is "offline." Furthermore, if Aaron is not in Sara's block list, but Aaron also is not in Sara's messenger list, then the presence indication provided to Aaron for Sara will be a basic presence indication.

It should be noted that the previous examples are just that—examples—and other examples are possible. For example, providing or blocking a presence indication is not limited to what is specifically described. For example, blocking Sara's presence indication from being provided to Aaron may include completely blocking the presence indication (and, for example, indicating that the presence information is being blocked or otherwise providing a "null" indication) or, in some examples, it may include allowing the provision of a presence indication to Aaron that is essentially meaningless, such as always providing an indication that Sara is offline, whether or not that presence indication is truly indicative of Sara's presence status.

As another example, the presence or absence of Aaron on a white list or black list associated with Sara may be overridden by other circumstances, such as global profiles associated with the presence model. As one example, Sara's IM system may be administratively configured to not allow presence indications to be provided to users of certain domains, or to only allow presence indications to be provided to users of certain domains. As another example, Sara may have configured her profile in a "do not disturb" mode to globally present an offline presence indication, even though Sara is not offline.

In accordance with an additional aspect, a global online presence indicator may be enhanced such that an individual user's messaging and/or block list is consulted, thus minimizing or avoiding inconsistent presence indications. Conventionally, global online presence indications are provided without consultation to a user's messenger and/or block list. In accordance with the additional aspect, then, the particular user can configure the global online presence indicator to provide a default presence indication, which may be overridden based on the particular user's messenger and/or block list, without regard for other users' messenger lists. That is, this enforces the notion that the only users who can see the particular user's enhanced presence indication are users who are on the particular user's messaging list, without regard for whether, at some point, the particular user had given permission for the other user's to put the particular user on their messaging lists.

Put another way, as an example, the user can have the ability to set a global "do not show me as online" preference that will override the ability to see that user's basic presence by all users not on that user's messaging list. This may be seen as akin, for example, to not publishing a user's phone number in the phone book—but anyone who is called by that user can see the user's number/name via caller ID.

As another example, Sara may have configured her profile to allow particular information to only be provided to particular denoted users, such as very personal information that Sara desires is not to be made generally available even as part of her "normal" enhanced profile, except perhaps to close friends or family. Such configuration may be made, for example, using user interface elements associated with Sara's messenger list.

A useful result of the scenarios discussed above includes, for example, that a user can be prompted to decide "on the fly" if she wishes to communicate with a particular other user, as the particular other user attempts to communicate with that user. Furthermore, that "on the fly" decision may include treating the particular other user as a mere casual contact such as, by allowing only basic presence information to be provided to the particular other user. In addition, by prompting a user to build up her messenger list "on the fly," this can overcome what might otherwise be an impediment to using instant messaging, which is that generally one would have to populate a messenger list with contact information for other users prior to being able to carry on instant messaging communication with those users.

Figure 5:
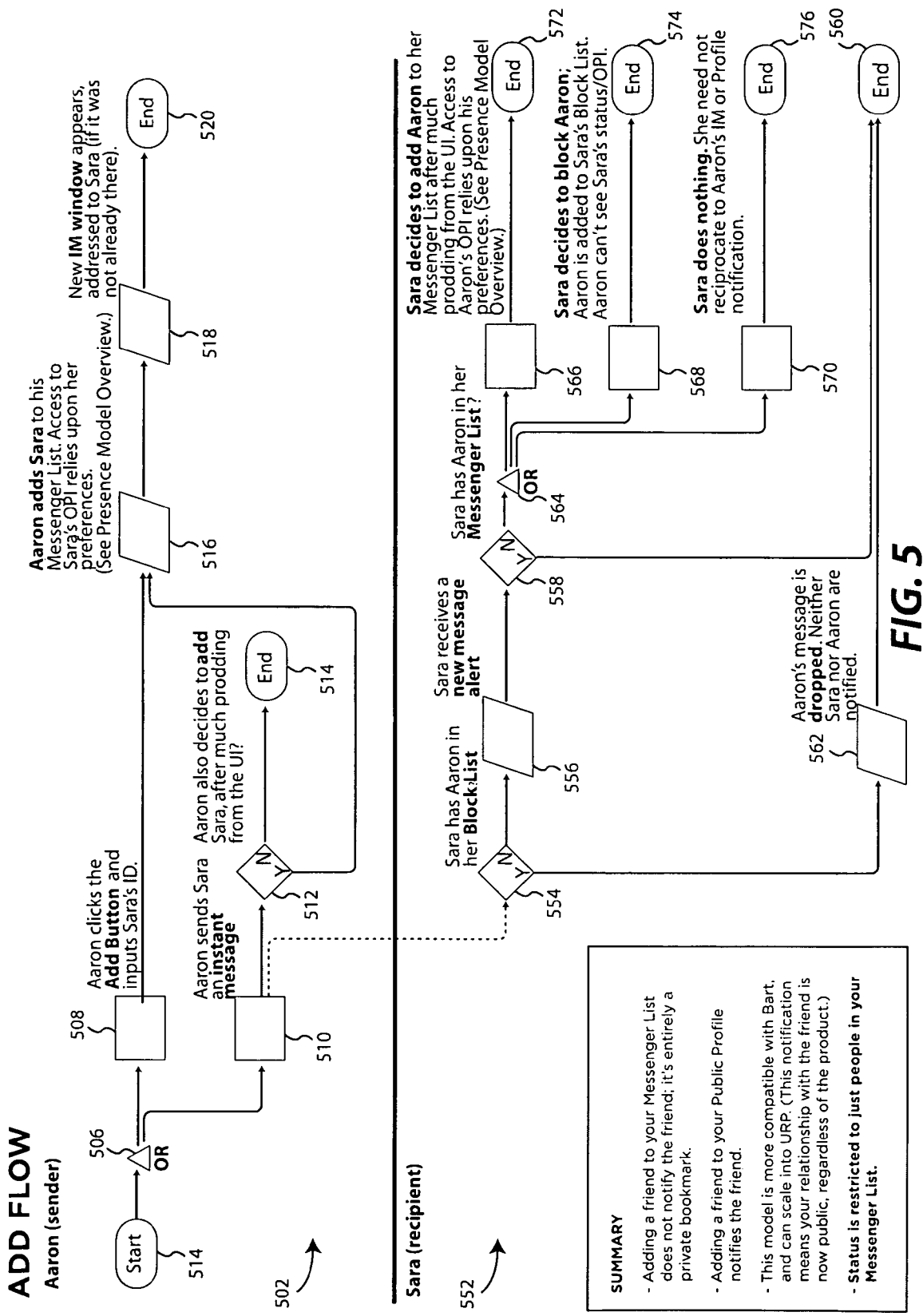
FIG. 5 is a flowchart illustrating an example process to, using the example users of Sara and Aaron, determine whether Sara and Aaron are added to each other's messaging lists.

We now refer to FIG. 5, which is a flowchart illustrating an example process to, using the example users above of Sara and Aaron, determine whether Sara and Aaron are added to each other's messaging lists (which, as discussed above, a presence model uses to control how and what presence indications are provided). The top portion 502 indicates processing with respect to Aaron (a message sender), whereas the bottom portion 552 indicates processing with respect to Sara (a message recipient).

Starting with the top portion 502, processing begins at 504. At 506, there are two diverging paths. At 508, Aaron clicks an "add" button on a user interface presented to Aaron and provides Sara's messenger ID. On the other path, at 510, Aaron sends Sara a message (such as an instant message). At 516, Aaron adds Sara to Aaron's messenger list. Access to Sara's online presence indication (OPT) is, at this point, according to Sara's global preferences, since Aaron is neither in Sara's messaging list nor in Sara's block list. At 518, if it was not already provided, a new messaging window is presented to Aaron with a message addressed to Sara. At 520, processing ends. Continuing now on the other path, from 510, at 512, it is determined if Aaron decides to add Sara to Aaron's messenger list. If not, processing ends at 514. If so, then processing continues at 516, where access only to Sara's OPI is provided.

We now refer to the lower portion 552 of FIG. 5, which indicates processing with respect to Sara. At 554, it is determined if Sara has Aaron in Sara's block list. If not, then Sara receives a new message alert at 556. At 558, it is determined if Aaron is in Sara's messenger list. If Aaron is already in Sara's messenger list, then add processing with respect to Sara ends 560. Also, if at 554, it was determined that Sara has Aaron in Sara's block list, then Aaron's message is dropped 562 (e.g., with neither Aaron or Sara being notified of such) and processing ends 560.

If, at 558, it is determined that Sara does not have Aaron in Sara's messenger list, then three alternatives 564 are possible. At 566, Sara decides to add Aaron to Sara's messenger list. Access to Aaron's OPI relies upon Aaron's preferences. At 568, Sara decides to block Aaron. Aaron is added to Sara's block list, and Aaron cannot even see Sara's OPI, since the block list overrides the OPI. At 570, Sara does nothing with respect to adding Aaron, so Aaron is neither on Sara's messenger list nor on Sara's block list, and processing ends at 576.

Figure 6:
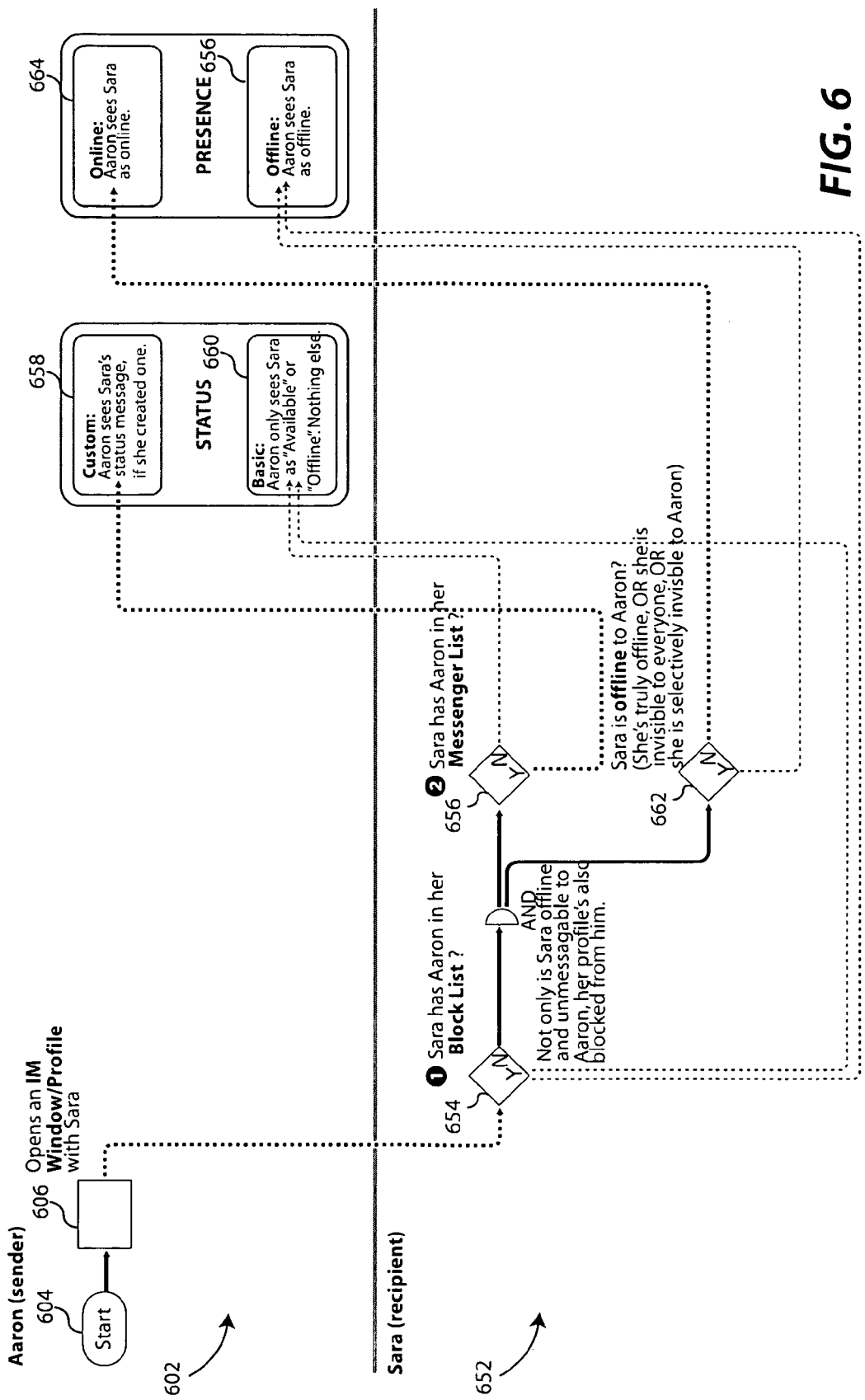
FIG. 6 is a flowchart illustrates an example process to, still using the example users of Sara and Aaron, determine what presence indication to present to Aaron for Sara.

Having described the "add flow" (processing to add a user to a messenger list or block list), we now describe with reference. In this case, FIG. 6 illustrates how it may be determined what presence indication to present to Aaron for Sara. The top portion 602 refers to processing with respect to Aaron (a message sender), whereas the bottom portion 652 indicates processing with respect to Sara (a message recipient). Processing begins at 604.

At 606, an IM Window/Profile with Sara is opened. On Sara's side (see bottom portion 652 of FIG. 6), if Sara has Aaron in Sara's block list, then Sara's presence is presented to Aaron as offline. If, at 654, Sara does not have Aaron in Sara's block list then, if Sara has Aaron in Sara's messenger list (656) then, at 658, Aaron sees Sara's enhanced presence indication, such as including status message, if Sara has created a status message. Otherwise, if at 654, Sara does not have Aaron in Sara's block list and Sara does not have Aaron in Sara's messenger list, then, at 660, Aaron only sees Sara as "available" or "offline."

On the other hand, if Sara does not have Aaron in Sara's block list (654) and, at 662, Sara is offline to Aaron (either because Sara is truly offline, is invisible to everyone, or is selectively invisible to Aaron), then Aaron sees Sara as offline (656). Otherwise, Aaron sees Sara as online 664.

Figure 7A:
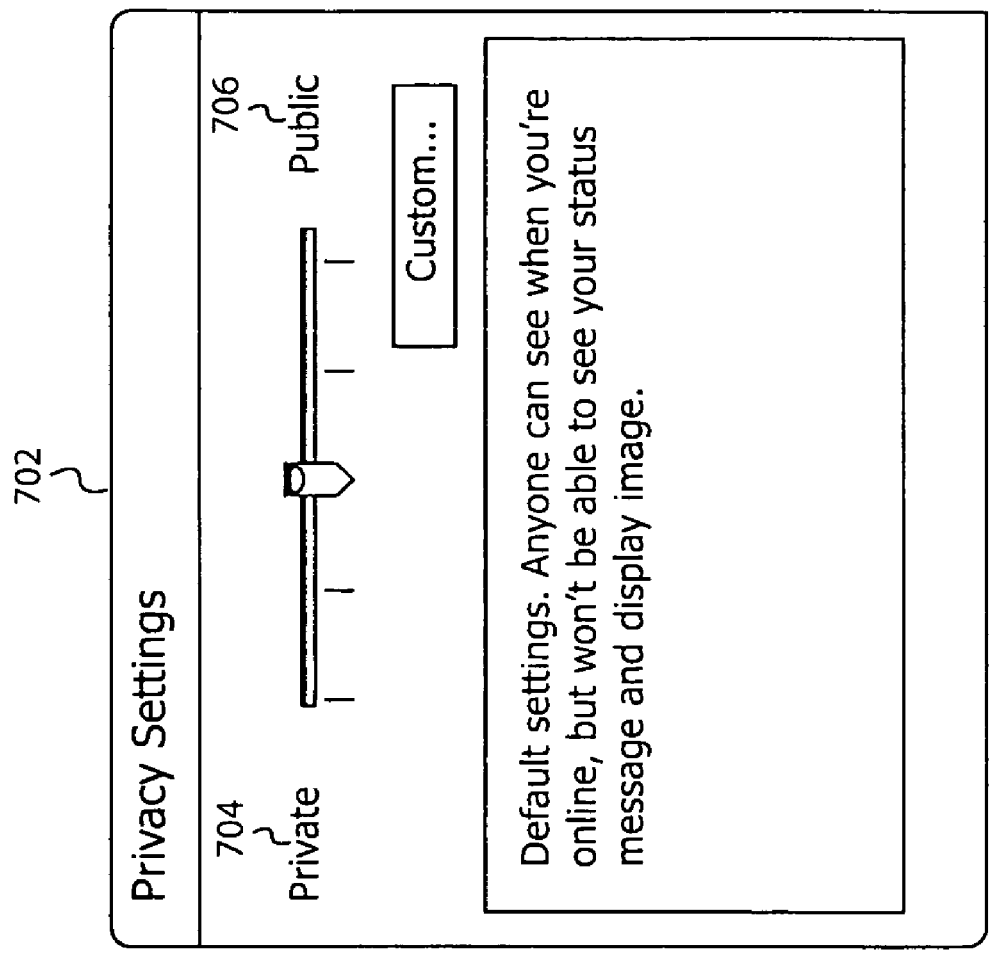
FIG. 7A is an example of a slider user interface, in which a privacy setting may be set anywhere from "private" to "public", with other intermediate settings.

Having described examples of add flow and presence flow, we now describe an example in which a user may control her online presence indication (OPI), and related messaging privacy settings, globally. Furthermore, the example provides that the user may control her OPI using a continuum of preset privacy settings, beyond a mere binary on/off setting for the online presence indication. In FIG. 7a, an example is shown of a slider user interface 702, in which a privacy setting may be set anywhere from "private" 704 to "public" 706, with other intermediate settings.

Figure 7B:
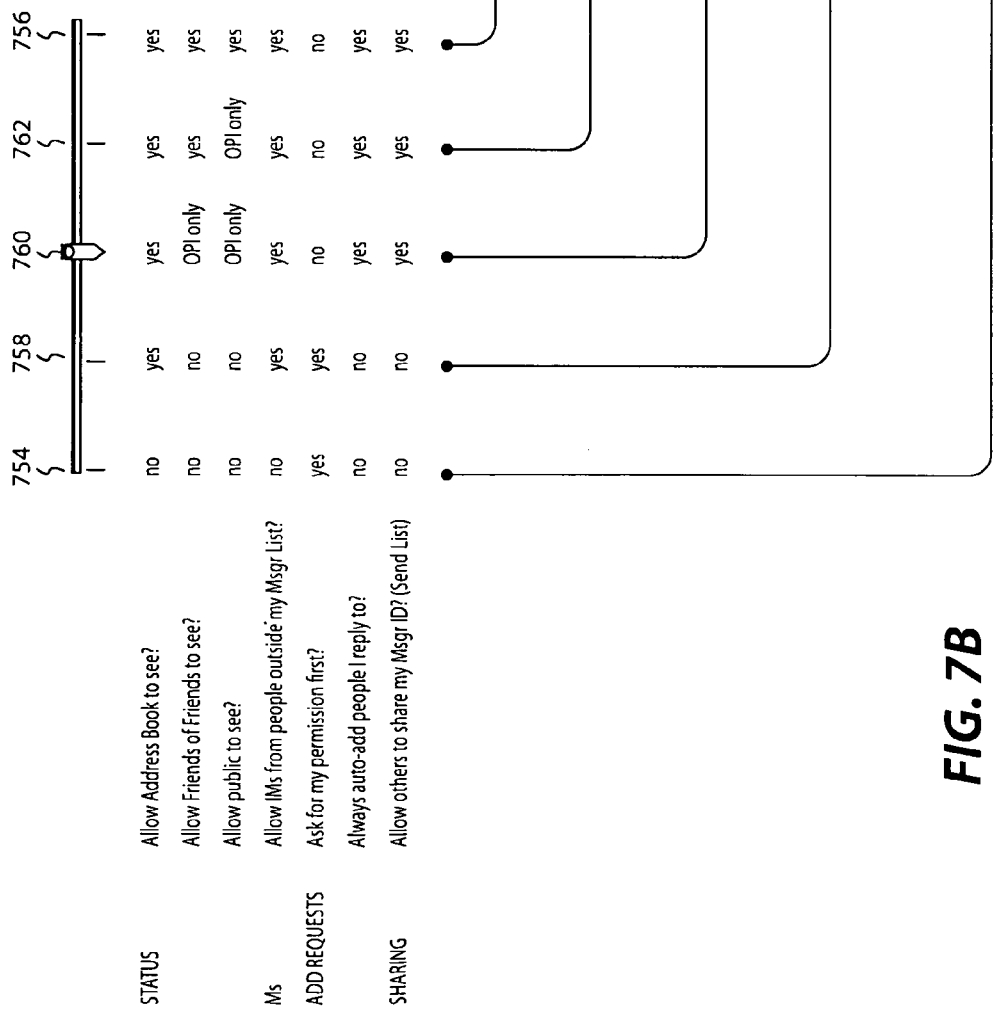
FIG. 7B is a table illustrating an example of the continuum of preset privacy settings.

FIG. 7B is a table illustrating an example of the continuum of preset privacy settings. Column 754 (corresponding to the setting 704 in FIG. 7A) has preset privacy settings for "status," "IM's," "add requests" and "sharing" that correspond to what is deemed to be the most private of settings. On the other hand, column 756 (corresponding to the setting 706 in FIG. 7A) has preset privacy settings that correspond to what is deemed to be the most public of settings. Columns 758, 760 and 762 have preset privacy settings that are progressively more public.

For example, with the settings of column 754, in general, no one will see when the user is online, and the user will not receive messages from users outside of those explicitly listed on the user's messenger list. For column 758, only users explicitly added to a user's messenger list will see when the user is online. In addition, the user will be alerted when users not on the user's messenger list attempt to see when the user is online. The middle column 760, is a "middle ground," such that users can see when the user is online, but the other users will not see the user's enhanced presence indication (e.g., including a status message for the user). That is, only a basic presence indication is provided to users not in that user's messenger list.

The column 762 is such that, in addition to those listed in the user's messenger list, users listed in those users' messenger lists ("friends of friends") can also see the user's enhanced presence indication. Finally, as mentioned above, the column 756 includes preset privacy settings that are the most public, such that anyone can see when the user is online and, in addition, can see the user's enhanced presence indication, including a status message.

Figure 4:
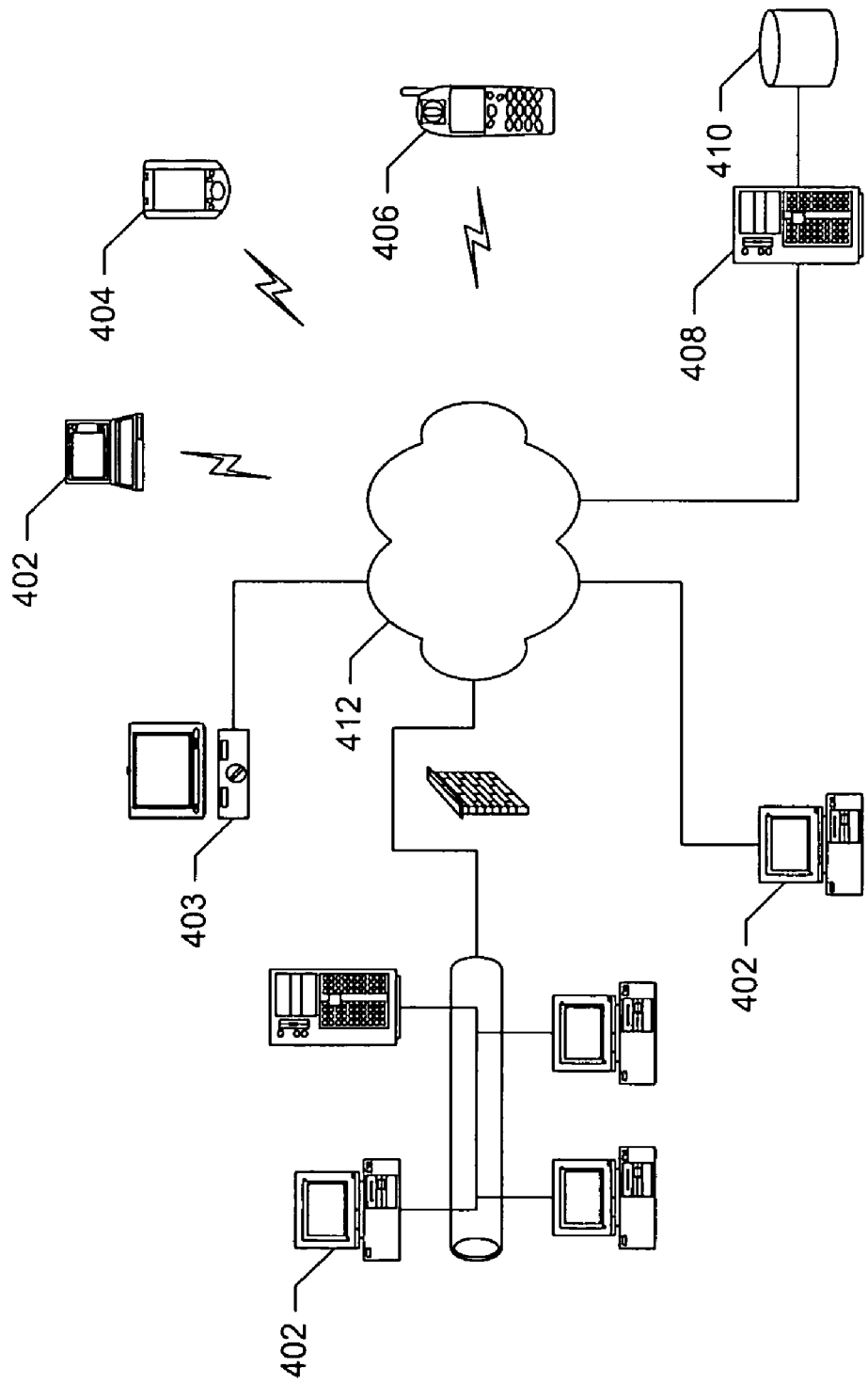
FIG. 4 is a simplified diagram of a network environment in which specific embodiments of the present invention may be implemented.

Embodiments of the present invention may be employed to configure presence indications in a wide variety of computing contexts. For example, as illustrated in FIG. 4, implementations are contemplated in which users may interact with a diverse network environment via any type of computer (e.g., desktop, laptop, tablet, etc.) 402, media computing platforms 403 (e.g., cable and satellite set top boxes and digital video recorders), handheld computing devices (e.g., PDAs) 404, cell phones 406, or any other type of computing or communication platform.

According to various embodiments, applications may be executed locally, remotely or a combination of both. The remote aspect is illustrated in FIG. 4 by server 408 and data store 410 which, as will be understood, may correspond to multiple distributed devices and data stores.

The various aspects of the invention may also be practiced in a wide variety of network environments (represented by network 412) including, for example, TCP/IP-based networks, telecommunications networks, wireless networks, etc. In addition, the computer program instructions with which embodiments of the invention are implemented may be stored in any type of tangible computer-readable media, and may be executed according to a variety of computing models including, for example, on a stand-alone computing device, or according to a distributed computing model in which various of the functionalities described herein may be effected or employed at different locations.

What is claimed is:

1. A method of maintaining a presence model for a messaging system to message among a plurality of computing device users via a communication network, comprising:

maintaining a permission for providing to a first computing device a presence indication for a user of a second computing device;

based on an indication of a user of the first computing device not being in a messaging list for the user of the second computing device, maintaining the permission to provide only a basic presence indication to the first computing device for the user of the second computing device and to not provide to the first computing device an enhanced presence indication for the user of the second computing device;

from the first computing device, causing a message to be sent to the second computing device, wherein the message caused to be sent from the first computing device to the second computing device is a message from the user of the first computing device to the user of the second computing device and, based on the maintained permission and as a result of the message being sent from the first computing device to the second computing device, providing the basic presence indication for the user of the second computing device to the first computing device;

also as a result of the message being sent from the first computing device to the second computing device, automatically providing on the second computing device a user interface element for the user of the second computing device to provide an indication to the messaging system of whether to add the user of the first computing device to a messaging list for the user of the second computing device, so as to maintain the permission to provide the enhanced presence indication to the first computing device for the user of the second computing device; maintaining the permission further includes maintaining a global default presence indication for the second user, which may provide more or less information than the basic presence information; and wherein the method further comprises responding to a global presence indication request made by the user of the first computing device for the presence indication of the second user, including determining if the user of the first computing device is an identified user; if the user of the first computing device is determined to not be an identified user, providing the global default presence indication as the requested global presence indication; and otherwise, if the user of the first computing device is in the messaging list associated with the second user, providing the user of the first computing device with the enhanced presence indication for the user of the second computing device as the requested global presence indication.

2. The method of claim 1, wherein:

the basic presence indication includes an indication of whether the user of the second computing device is online to receive messages from the first computing device.

3. The method of claim 2, wherein:

the enhanced presence indication includes all of the information in the basic presence indication and, additionally, includes information about the user of the second computing device beyond merely whether the user of the second computing device is online to receive messages from the first computing device.

4. The method of claim 1, further comprising:

based on not receiving an indication to the messaging system, via the user interface element provided on the second computing device, of whether to add the user of the first computing device to a messaging list for the user of the second computing device, maintaining the permission to provide only the basic presence indication to the first computing device for the user of the second computing device.

5. The method of claim 1, wherein:

the user interface element provided on the second computing device is additionally for the user of the second computing device to provide an indication to the messaging system of whether to add the user of the first computing device to a block list for the user of the second computing device, so as to maintain the permission to provide no presence indication to the first computing device for the user of the second computing device.

\* \* \* \* \*